US 12,445,024 B2

(12) United States Patent
Zhang et al.

(10) Patent No.: US 12,445,024 B2
(45) Date of Patent: Oct. 14, 2025

(54) RESOLVER WITH A STATOR AND A COVER

(71) Applicants: TE Connectivity Solutions GmbH, Schaffhausen (CH); TE Sensores, S. De R.L. DE C.V., Sonora (MX)

(72) Inventors: Xingzhe Zhang, Winston Salem, NC (US); Georg Friesen, Winston Salem, NC (US); Oscar Sosa, Tlalnepantla (MX); Mark Rice, Winston Salem, NC (US); Jose Antonio Aispuro, Tlalnepantla (MX)

(73) Assignee: TEC CONNECTIVITY SOLUTIONS GmbH et al., Schaffhausen (CH)

( * ) Notice: Subject to any disclaimer, the term of this patent is extended or adjusted under 35 U.S.C. 154(b) by 432 days.

(21) Appl. No.: 18/161,940

(22) Filed: Jan. 31, 2023

(65) Prior Publication Data

US 2024/0258887 A1    Aug. 1, 2024

(51) Int. Cl.
*H02K 5/22*     (2006.01)
*H02K 15/02*     (2006.01)
*H02K 15/14*     (2006.01)

(52) U.S. Cl.
CPC ............. *H02K 15/02* (2013.01); *H02K 5/225* (2013.01); *H02K 15/14* (2013.01); *H02K 2215/00* (2021.08)

(58) Field of Classification Search
CPC ........ H02K 5/225; H02K 15/02; H02K 15/14; H02K 2215/00
USPC ....................................................... 310/254.1
See application file for complete search history.

(56) References Cited

U.S. PATENT DOCUMENTS

| | | | |
|---|---|---|---|
| 5,920,135 A * | 7/1999 | Ohshita | H02K 3/50 310/71 |
| 2021/0320540 A1* | 10/2021 | Kim | H02K 15/022 |
| 2021/0408851 A1* | 12/2021 | Takahashi | H02K 1/2746 |
| 2022/0037967 A1* | 2/2022 | Yamaguchi | H02K 11/33 |
| 2022/0166290 A1* | 5/2022 | Takahashi | H02K 9/223 |
| 2023/0034008 A1* | 2/2023 | Takahashi | H02K 15/12 |
| 2023/0047704 A1* | 2/2023 | Lee | H02K 5/225 |
| 2023/0094248 A1* | 3/2023 | Iwasaki | H02K 11/33 310/74 |
| 2023/0102080 A1* | 3/2023 | Iwasaki | H02K 5/1732 310/71 |
| 2024/0258860 A1* | 8/2024 | Niwa | H02K 21/24 |
| 2024/0258887 A1* | 8/2024 | Zhang | H02K 15/02 |
| 2025/0052631 A1* | 2/2025 | Seo | G01L 5/221 |

* cited by examiner

*Primary Examiner* — Rashad H Johnson

(57) ABSTRACT

A resolver includes a stator having a stator body formed of a first plastic material and a cover covering a side of the stator. The cover has a cover body formed of a second plastic material. The first plastic material of the stator body is attached to the second plastic material of the cover body by a plastic weld.

20 Claims, 5 Drawing Sheets

RESOLVER WITH A STATOR AND A COVER

FIELD OF THE INVENTION

The present invention relates to a resolver and, more particularly, to a stator and a cover of a resolver attached to one another.

BACKGROUND

A resolver generally includes a stator, a rotor disposed within the stator, and, in some applications, an external cover in which the stator and rotor are positioned. The stator is attached to the cover and positioned around the rotor, which is commonly attached to the end of a shaft, for example of a drive unit of a motor or transmission. The stator detects the rotational position and the rotational speed of the rotor. The cover prevents environmental conditions, such as dust or water, from impacting the accuracy of the stator measurements.

The cover is commonly made of a metal material and the stator is fixed to the cover by screws or bolts. Using the fasteners with the metal cover, however, increases the weight, material cost, eddy current interference, and assembly time of the resolver. Further, if the stator is partially made of a plastic material, the fasteners decrease the durability of the plastic, and the difference in material at the interface between the stator and the cover can lead to damage in thermal expansion. Additionally, the metal material of the cover, while providing mechanical protection, cannot be overmolded on any components of the resolver. These factors all contribute to decreased accuracy and increased cost of the resolver.

SUMMARY

A resolver includes a stator having a stator body formed of a first plastic material and a cover covering a side of the stator. The cover has a cover body formed of a second plastic material. The first plastic material of the stator body is attached to the second plastic material of the cover body by a plastic weld.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
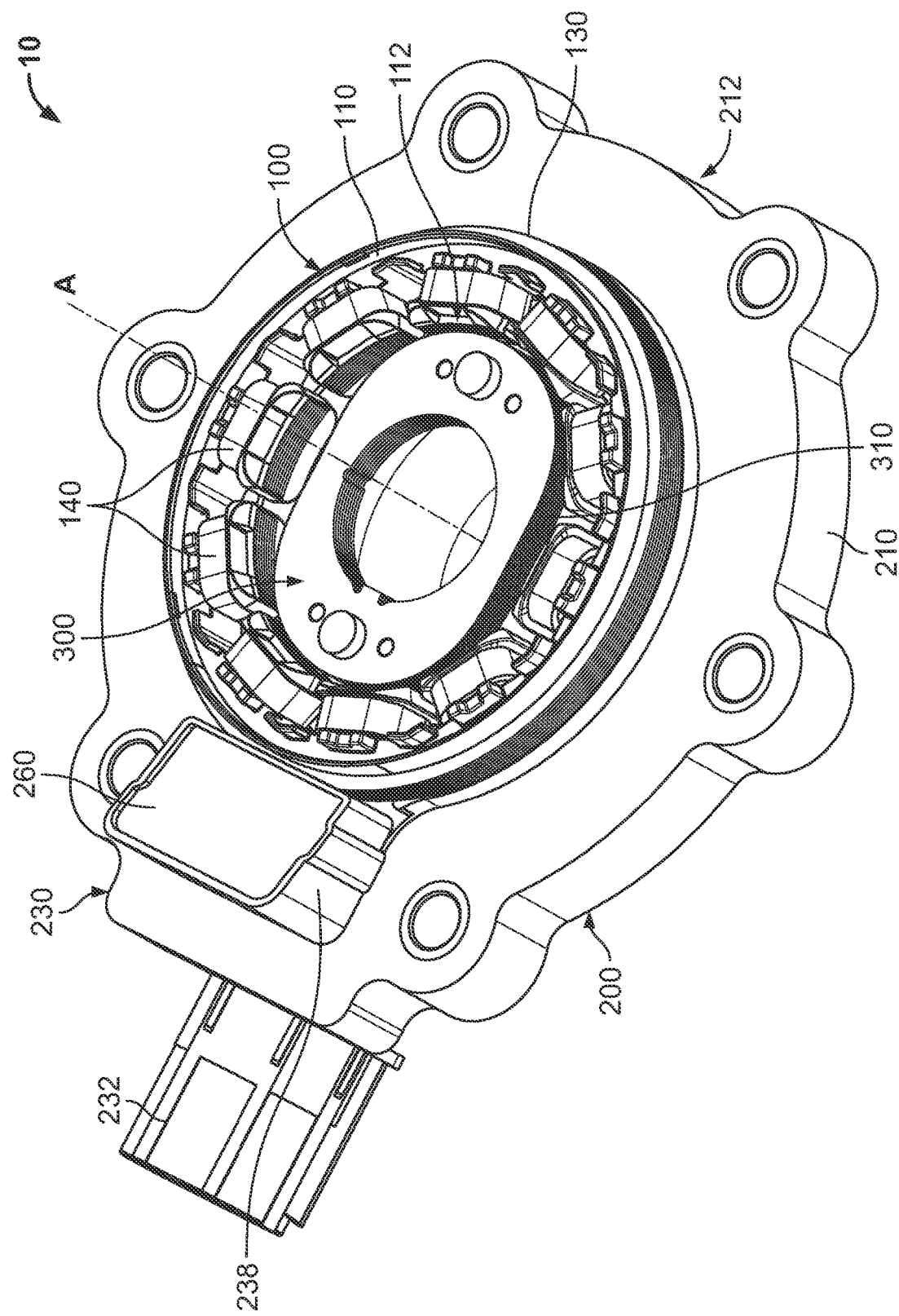
FIG. 1 is a perspective view of a resolver according to an embodiment.

Exemplary embodiments of the present disclosure will be described hereinafter in detail with reference to the attached drawings, wherein like reference numerals refer to like elements.

The present disclosure may however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "rotation axis". These descriptors are merely for clarity of the description and for differentiation of the various directions. These directional descriptors do not imply or require any particular orientation of the disclosed elements.

A resolver 10 according to an embodiment is shown in FIG. 1. The resolver 10 includes a stator 100, a cover 200 covering the stator 100, and a rotor 300 disposed within the stator 100. The rotor 300 is rotatable with respect to the stator 100 and the cover 200 and the stator 100 has an output indicating a rotational position and/or a rotational speed of the rotor 300.

In an embodiment, the resolver 10 is disposed on an end of a shaft of a drive unit, such as a motor or transmission of an electric vehicle. The rotor 300 is attached to the shaft in this embodiment and the stator 100 measures the speed and position of the drive unit shaft via the rotor 300. The cover 200 covers a side of the stator 100 opposite the drive unit; in this embodiment, the cover 200 may be referred to as an end of shaft cover 200.

Figure 2:
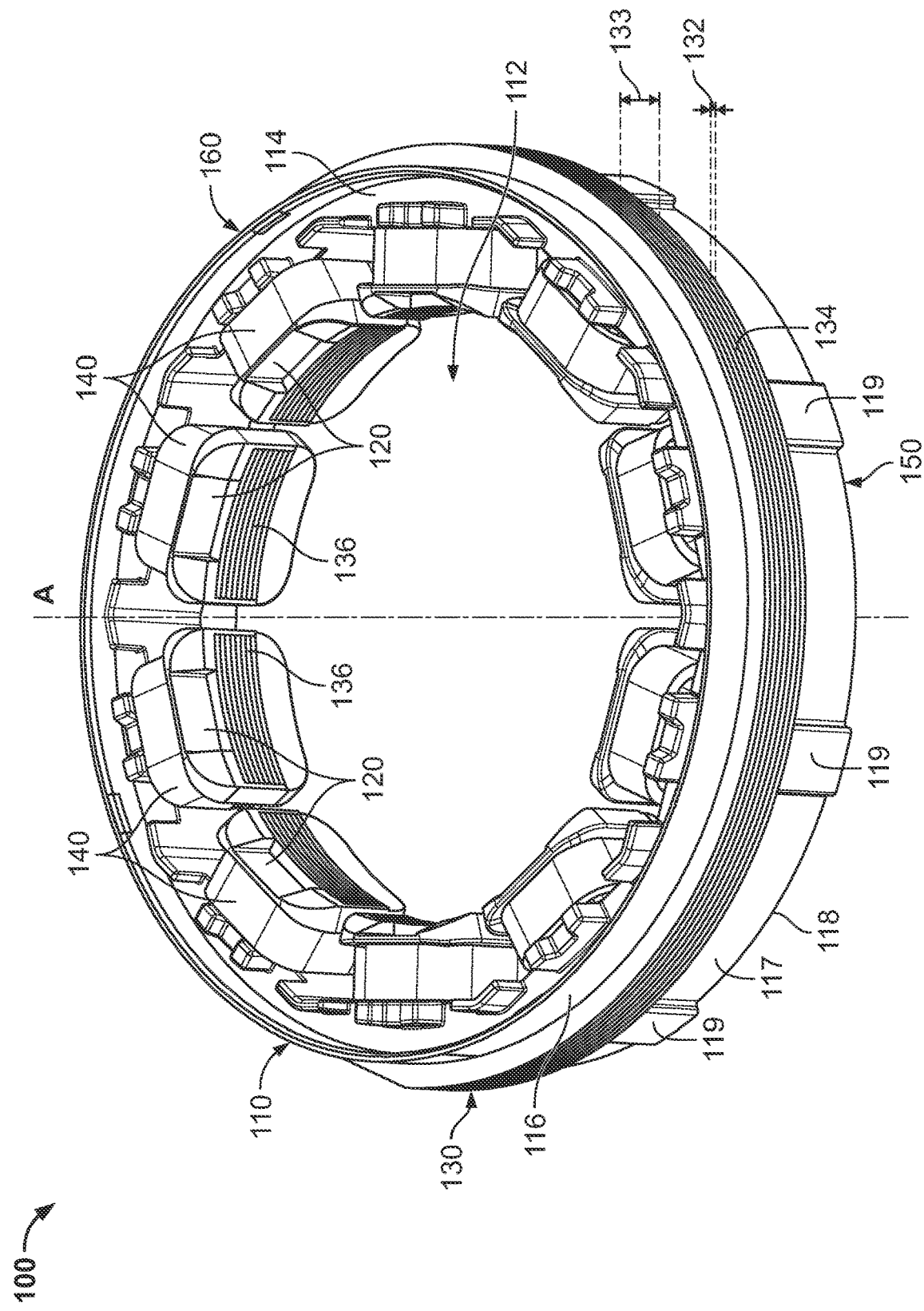
FIG. 2 is a perspective view of a stator of the resolver.

The stator 100, as shown in FIGS. 1 and 2, includes a stator body 110, a plurality of stator plates 130 disposed within the stator body 110, and a plurality of wires 140 disposed around the stator body 110. The assembled stator 100 shown in FIG. 2 has a first side 150 and a second side 160 opposite the first side 150 along the rotation axis A.

As shown in FIG. 2, the stator body 110 has a frame 114 defining a rotor receiving space 112. The frame 114 has an upper portion 116 and a lower portion 117 opposite the upper portion 116 in a direction extending along a rotation axis A. The frame 114 has an end 118 along the rotation axis A that is formed by the lower portion 117. The lower portion 117 of the frame 114 has a plurality of positioning protrusions 119 evenly spaced circumferentially around the lower portion 117 and protruding from the lower portion 117.

The stator body 110 has a plurality of poles 120 extending from the frame 114 into the rotor receiving space 112. The poles 120 are arranged circumferentially and at an interval on a side of the frame 114 facing the rotor receiving space 112.

The stator body 110, including the frame 114 and the poles 120, is formed of a first plastic material. In an embodiment, the first plastic material is a polymer, such as polyphthalamide (PPA), polypenylene sulfide (PPS), or a polyester. In an embodiment, the stator body 110 is monolithically formed in a single piece from the first plastic material, such as by overmolding as described below. In another embodiment, the stator body 110 can be formed of a plurality of pieces of the first plastic material and assembled together to form the stator body 110 described herein.

The stator plates 130 are disposed within the stator body 110, between the upper portion 116 and the lower portion 117 of the frame 114, as shown in FIG. 2. The stator plates 130 each have a plate thickness 132 in a direction extending along the rotation axis A. The number of stator plates 130 between the upper portion 116 and the lower portion 117 can vary in different embodiments for different applications while the plate thickness 132 remains the same, leading to a different overall thickness 133 of the stator plates 130 along the rotation axis A and a different dimension of the stator 100 along the rotation axis A in different embodiments.

As shown in FIG. 2, the stator plates 130 each have an outer portion 134 and a plurality of protrusions 136 extending from the outer portion 134. The outer portion 134 is disposed in the frame 114 between the upper portion 116 and the lower portion 117 and each of the protrusions 136 is disposed in one of the plurality of poles 120. In an embodiment, the stator plates 130 are each identical to one another.

The stator plates 130 are formed of a conductive material, such as silicon steel. The stator plates 130 can be monolithically formed in a single piece from the conductive material or may be formed in a plurality of separate pieces of the conductive material and attached together.

As shown in FIG. 2, the wires 140 are each disposed around one of the poles 120. In an embodiment, the wires 140 are each a copper material wrapped around the poles 120.

Figure 3:
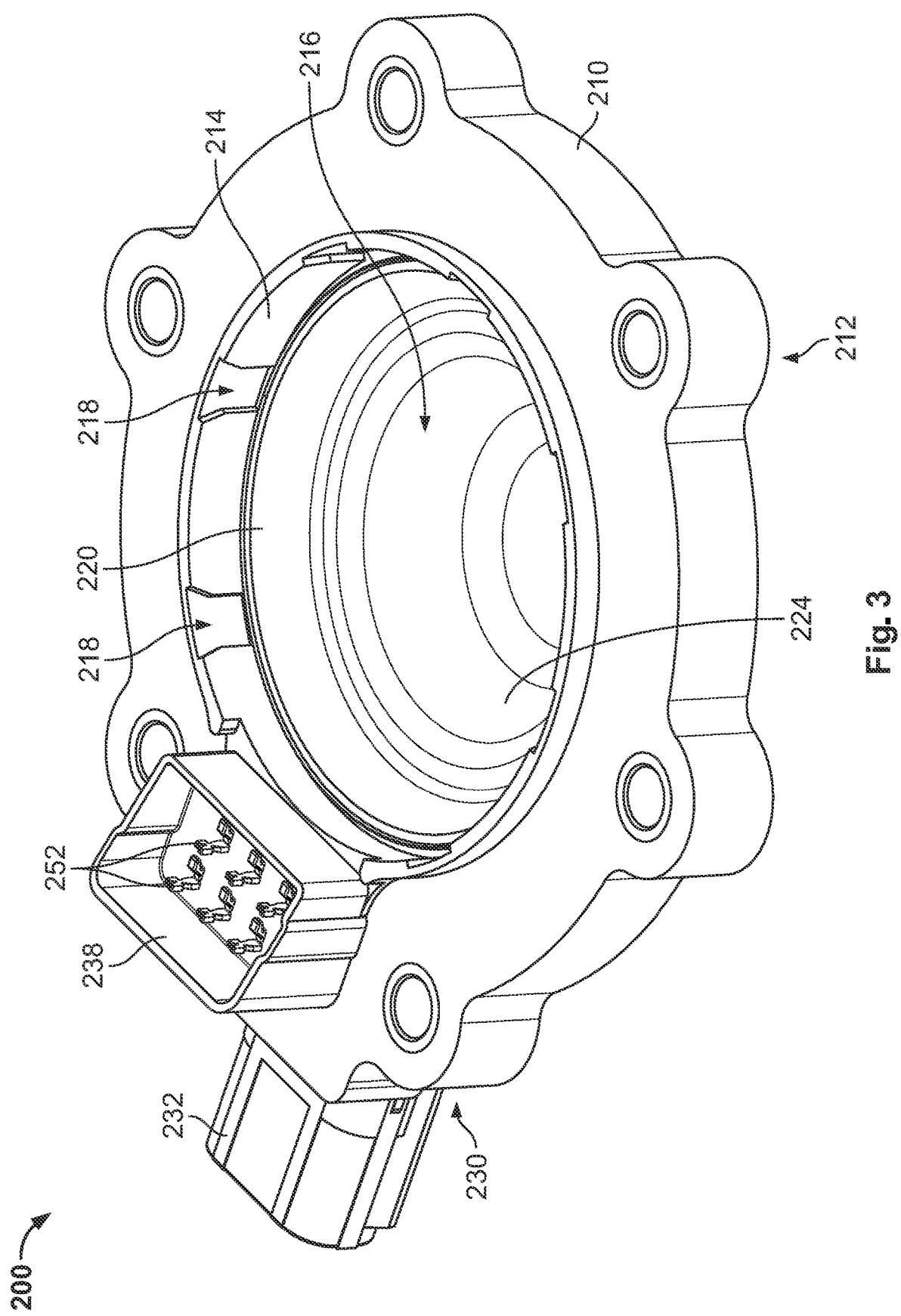
FIG. 3 is a perspective view of a cover of the resolver.

The cover 200, as shown in FIGS. 1 and 3, includes a cover body 210 having a stator receiving portion 212 and a connection portion 230 extending from the stator receiving portion 212. The cover body 210, including the stator receiving portion 212 and the connection portion 230, is formed of a second plastic material. In an embodiment, the second plastic material is a polymer, such as polyphthalamide (PPA), polypenylene sulfide (PPS), or a polyester. In an embodiment, the second plastic material is the same material as the first plastic material of the frame 114. In another embodiment, the second plastic material is a different material than the first plastic material, but both materials have similar thermal expansion properties.

The cover body 210, including the stator receiving portion 212 and the connection portion 230, may be monolithically formed in a single piece from the second plastic material. In another embodiment, the stator receiving portion 212 and the connection portion 230 can be separately formed from the second plastic material and attached together.

Figure 4:
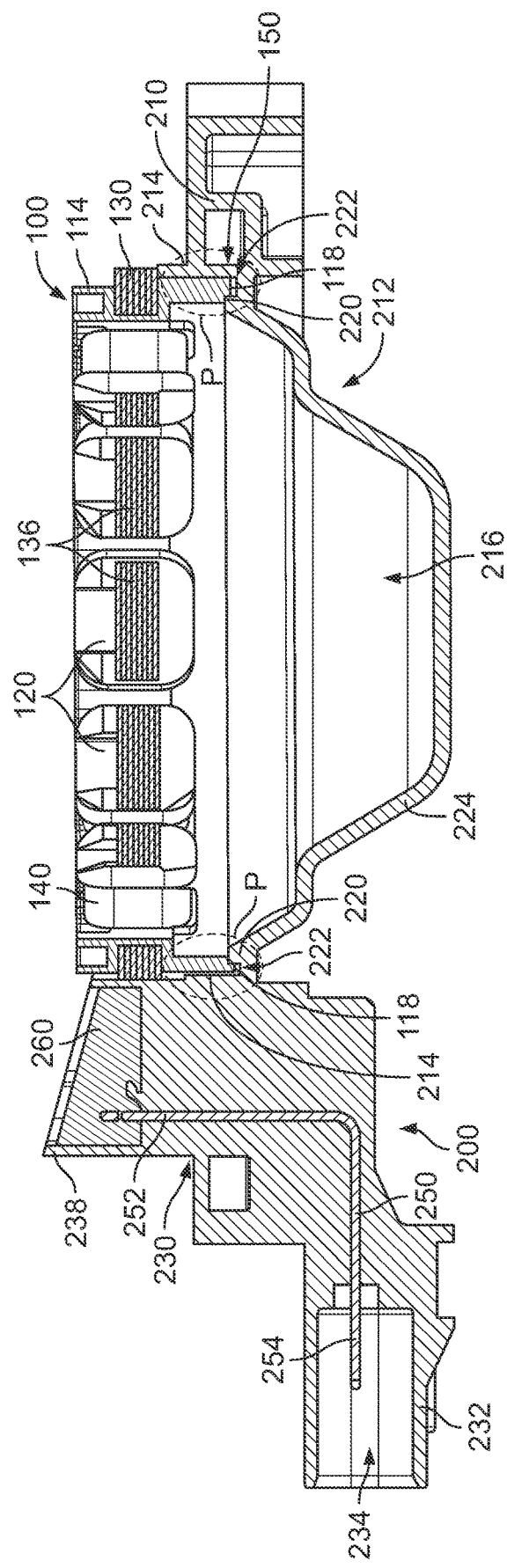
FIG. 4 is a sectional side view of the stator attached to the cover.

As shown in FIGS. 3 and 4, the stator receiving portion 212 has a rim wall 214 defining a stator receiving space 216. The rim wall 214 has a plurality of positioning recesses 218 evenly spaced circumferentially around the rim wall 214 and extending into the rim wall 214; the positioning recesses 218 face the stator receiving space 216. The stator receiving portion 212 has a lip 220 disposed within the stator receiving portion 212 and separated from the rim wall 214 by a groove 222. The cover body 210 has a cap 224 extending from the rim wall 214 in a dome-shape and enclosing an end of the stator receiving space 216.

The connection portion 230, as shown in FIGS. 3 and 4, has a stator interface 238 proximal to the stator receiving portion 212 and a connector interface 232 distal from the stator receiving portion 212. In the embodiment shown in FIGS. 3 and 4, the connector interface 232 has a mating connector receiving space 234 capable of receiving a mating connector matable with the resolver 10.

The cover 200 has a plurality of terminals 250 disposed in the connection portion 230 of the cover body 210, as shown in FIGS. 3 and 4. The terminals 250 each have a first end 252 and an opposite second end 254. The terminals 250 are each formed of a conductive material, such as aluminum. In the embodiment shown in FIGS. 3 and 4, the first end 252 of each of the terminals 250 is disposed in the stator interface 238 and the second end 254 of each of the terminals 250 is disposed in the connector interface 232. In an embodiment, the cover body 210 is molded around the terminals 250.

The first end 252 of each of the terminals 250 in the stator interface 238 is electrically and mechanically connected with one of the plurality of wires 140 wrapped around the poles 120. In the embodiment shown in FIGS. 1 and 4, a potting 260 may be filled in the stator interface 238 to encapsulate the first ends 252 of the terminals 250.

The rotor 300, as shown in FIG. 1, is formed of a conductive material, such as silicon steel, and is rotatable around the rotation axis A. In the shown embodiment, the rotor 300 is formed of a plurality of rotor plates 310 that are each identical to one another; the rotor plates 310 are stacked and attached together. In different embodiments and different applications, different numbers of rotor plates 310 can be stacked and attached to form the rotor 300, with the different embodiments having a different dimension along the rotation axis A.

A method of manufacturing the resolver 10 will now be described in detail primarily with reference to FIGS. 1 and 4.

The stator 100 is formed, as described above, with the stator plates 130 disposed within the stator body 110. The stator body 110 can be overmolded around the stator plates 130 to form the stator 100 as shown in FIG. 2. In another embodiment, the upper portion 116 and the lower portion 117 of the frame 114 can be formed separately and attached around the stator plates 130. The wires 140 are then wound around the poles 120 of the stator body 110 with the stator plates 130 disposed within the stator body 110.

As shown in FIG. 4, with the stator 100 formed as shown in FIG. 2, the first side 150 of the stator 100 is positioned in the stator receiving space 216 of the cover 200. The stator 100 is positioned at least partially within the rim wall 214; the end 118 of the stator body 110, formed by the lower portion 117 of the frame 114, is at least partially received in the groove 222. In an embodiment, the positioning protrusions 119 are received in the positioning recesses 218 to precisely locate the stator 100 relative to the cover 200. The stator 100 is positioned in the cover 200 with the cap 224 covering the first side 150 of the stator 100.

The stator 100 is attached and fixed to the cover 200 in the stator receiving space 216, in the position shown in FIG. 4, by a plastic weld P formed between the first plastic material of the stator body 110 and the second plastic material of the cover body 210. Exemplary regions of the plastic weld P are indicated by dashed ovals in FIG. 4. The plastic weld P is formed in the groove 222 between the cover body 210 and the end 118 of the stator body 110. The plastic weld P securely attaches the stator 100 to the cover 300 and fixes the position of the stator 100 with respect to the cover 200.

The plastic weld P, in various embodiments, can be formed by a number of different processes.

In an embodiment, the plastic weld P is formed by ultrasonic welding with the stator 100 positioned in the cover 200 as shown in FIG. 4. An ultrasonic horn creating the ultrasonic vibrations necessary for the ultrasonic weld can be positioned inside or outside of the stator 100 and the cover 200.

In another embodiment, the plastic weld P is formed by spin welding, in which either the stator 100 or the cover 200 positioned as shown in FIG. 4 is rotated clockwise or counterclockwise and the other of the stator 100 and the cover 200 remains stationary. In this embodiment, the positioning protrusions 119 of the lower portion 117 of the frame 114 are omitted to permit rotation of the stator 100 relative to the cover 200. The friction from the rotation creates the plastic weld P.

In another embodiment, the stator body 110 is laser welded to the cover body 210 in the position shown in FIG. 4. In this embodiment, one of the first plastic material of the stator body 110 and the second plastic material of the cover body 210 is a laser transparent material and the other of the first plastic material and the second plastic material is a laser absorbent material. The laser passes through the laser transparent material and is absorbed by the laser absorbent material, heating the laser absorbent material to create the plastic weld P.

In another embodiment, the plastic weld P is formed by hot plate welding. A hot plate is positioned between the stator 100 and the cover 200 before assembly into the position shown in FIG. 4. At least one of the first plastic material of the stator body 110 and the second plastic material of the cover body 210 is melted by the hot plate, and the stator 100 is then pressed against the cover 200 in the position shown in FIG. 4 to form the plastic weld P.

The above processes are exemplary and other methods of plastic welding, alone or in combination, can be used to form the plastic weld P between the stator 100 and the cover 200. In some embodiments, such as with the ultrasonic, laser, and hot-plate welding, the stator body 110 can be plastically welded to the cover body 210 around an entirety of the circumference of the rim wall 214 and the stator receiving space 216 or can be plastically welded to the cover body 210 selectively around a portion of the circumference of the rim wall 214 and the stator receiving space 216.

With the stator 100 fixed within the cover 200 as shown in FIG. 4, the rotor 300 is disposed in the rotor receiving space 112 of the stator 100, as shown in FIG. 1, to complete assembly of the resolver 10. The rotor 300 is rotatable with respect to the stator 100 and the cover 200. As the rotor 300 rotates, a magnetic field of the stator 100 varies at the poles 120, and two voltage output signals are transmitted to the terminals 250 by the wires 140. In the embodiment shown in FIGS. 1-4, the output can then be further transmitted externally to a control unit for rotational position and/or rotational speed calculation of the rotor 300 based on the voltage output signals by connecting a mating connector with the mating connector receiving space 234 of the connector interface 232.

Figure 5:
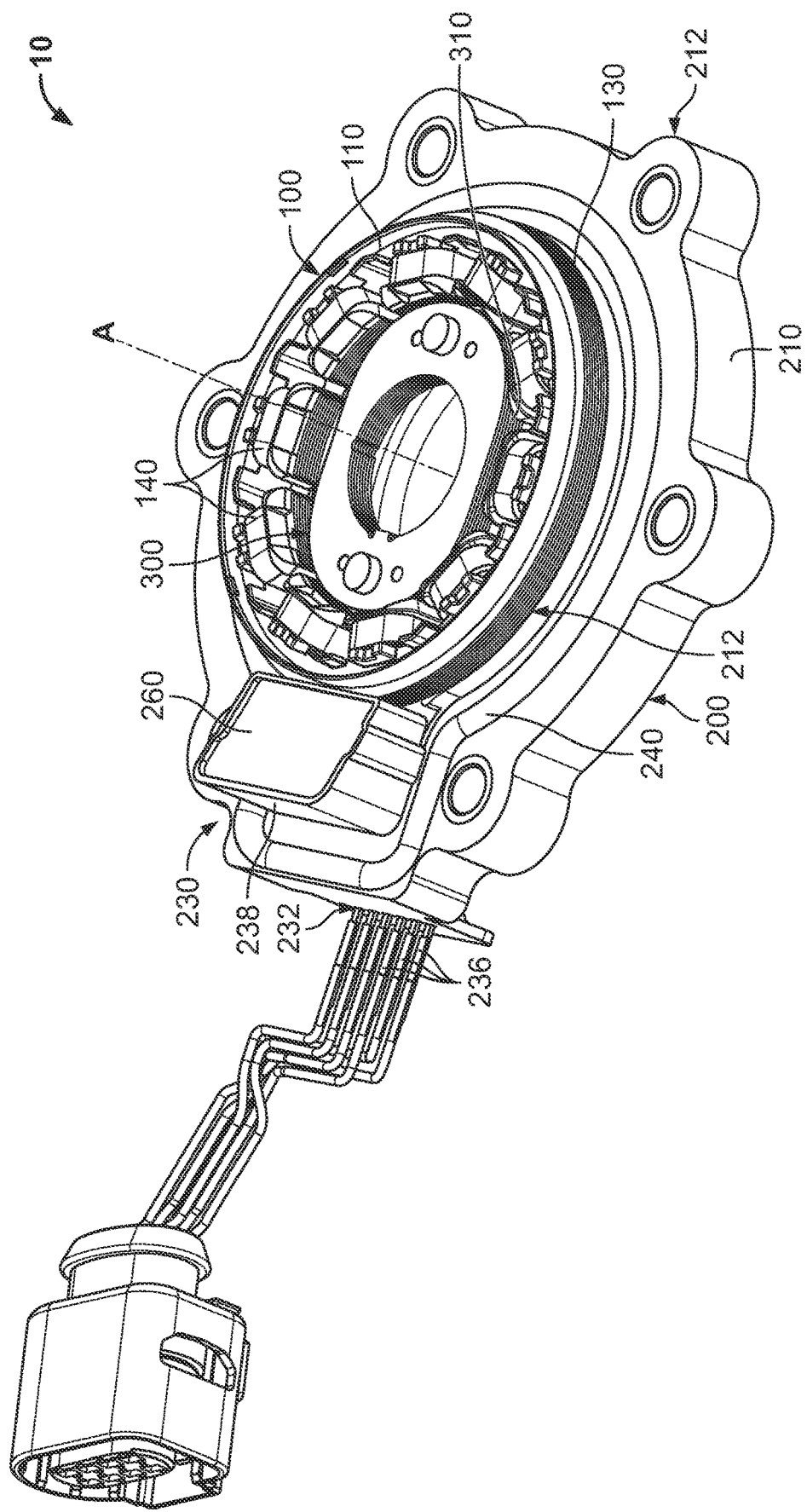
FIG. 5 is a perspective view of a resolver according to another embodiment.

A resolver 10 according to another embodiment is shown in FIG. 5. Like reference numbers refer to like elements, and primarily the differences from the embodiment shown in FIG. 1 will be described in detail herein.

In the embodiment shown in FIG. 5, the cover 200 has a gasket 240 attached to the cover body 210. In the shown embodiment, the gasket 240 surrounds the stator receiving portion 212 and the stator interface 238. The gasket 240 is formed of an elastically compressible material.

The connection portion 230 in the embodiment shown in FIG. 5 is monolithically formed with and extends from the stator receiving portion 212, as in the embodiment of FIG. 1, but the form of the connector interface 232 is different from the embodiment of FIG. 1. The connector interface 232 in the embodiment shown in FIG. 5 is a connection to a plurality of leads 236. The connector interface 232 in this embodiment may be referred to as a flying lead connector; the various embodiments of the connector interface 232 allow the resolver 10 to be connected externally in different applications.

In the resolver 10 according to the embodiments of the invention, the plastic weld P between the stator body 110 and the cover body 210 strongly and precisely fixes the position of the stator 100 in the cover 200 without the use of separate fasteners, such as bolts or screws. The plastic weld P thus maintains high accuracy through vibrations and other environmental effects, such as minimizing the effects of differences in thermal expansion between the stator body 110 and the cover body 210, without requiring the expense and difficulty of using additional fastener components. Further, the plastic material of the cover body 210 is less expensive, lighter weight, has high dielectric strength, and has no eddy current interference, among other material advantages, over the more commonly used metal cover material. Additionally, forming the connection portion 230 with the stator receiving portion 212 in the cover body 210, and integrating the terminals 250 in the connection portion 230, reduces the size and complexity of the resolver 10.

What is claimed is:

1. A resolver, comprising:
a stator having a stator body formed of a first plastic material; and
a cover covering a side of the stator, the cover having a cover body formed of a second plastic material, the first plastic material of the stator body is attached to the second plastic material of the cover body by a plastic weld.

2. The resolver of claim 1, wherein the first plastic material is a same material as the second plastic material.

3. The resolver of claim 1, wherein the cover body has a stator receiving portion with a rim wall defining a stator receiving space, the stator is positioned at least partially within the rim wall and attached to the cover in the stator receiving space.

4. The resolver of claim 3, wherein the stator receiving portion has a lip disposed within the stator receiving portion and separated from the rim wall by a groove.

5. The resolver of claim 4, wherein an end of the stator body is at least partially received in the groove and the plastic weld is formed in the groove between the cover body and the end of the stator body.

6. The resolver of claim 3, wherein the cover body has a cap extending from the rim wall and covering the side of the stator.

7. The resolver of claim 3, wherein the cover body has a connection portion monolithically formed with the stator receiving portion and extending from the stator receiving portion, the connection portion has a stator interface proximal to the stator receiving portion and a connector interface distal from the stator receiving portion.

8. The resolver of claim 7, wherein the cover has a plurality of terminals disposed in the cover body, each of the terminals has a first end disposed in the stator interface and a second end opposite the first end disposed in the connector interface.

9. The resolver of claim 7, wherein the connector interface defines a mating connector receiving space or is connected to a plurality of leads.

10. The resolver of claim 7, wherein the cover has a gasket attached to the cover body and surrounding the stator receiving portion and the stator interface.

11. The resolver of claim 1, wherein the stator has a plurality of stator plates disposed within the stator body.

12. The resolver of claim 11, wherein the stator body has a frame defining a rotor receiving space and a plurality of poles extending from the frame into the rotor receiving space.

13. The resolver of claim 12, wherein each of the stator plates has an outer portion disposed in the frame and a protrusion disposed in one of the plurality of poles.

14. The resolver of claim 13, wherein the stator has a plurality of wires each disposed around one of the poles.

15. The resolver of claim 12, further comprising a rotor disposed in the rotor receiving space, the rotor is rotatable with respect to the stator and the cover.

16. A method of manufacturing a resolver, comprising:
    providing a stator having a stator body formed of a first plastic material;
    providing a cover having a cover body formed of a second plastic material;
    positioning the cover to cover a side of the stator; and
    plastic welding the first plastic material of the stator body to the second plastic material of the cover body.

17. The method of claim 16, wherein the plastic welding is performed by ultrasonic welding, spin welding, or hot plate welding.

18. The method of claim 16, wherein one of the first plastic material and the second plastic material is transparent and the plastic welding is performed by laser welding.

19. The method of claim 16, wherein the stator has a plurality of stator plates disposed within the stator body, the stator body is overmolded around the stator plates.

20. The method of claim 16, wherein the cover has a plurality of terminals molded into the cover body.

\* \* \* \* \*